Nov. 20, 1962  LA VERNE O. ELLINGSON  3,064,841
BOAT CARRYING AND LOADING FACILITY FOR MOTOR VEHICLES
Filed May 12, 1958  3 Sheets-Sheet 1
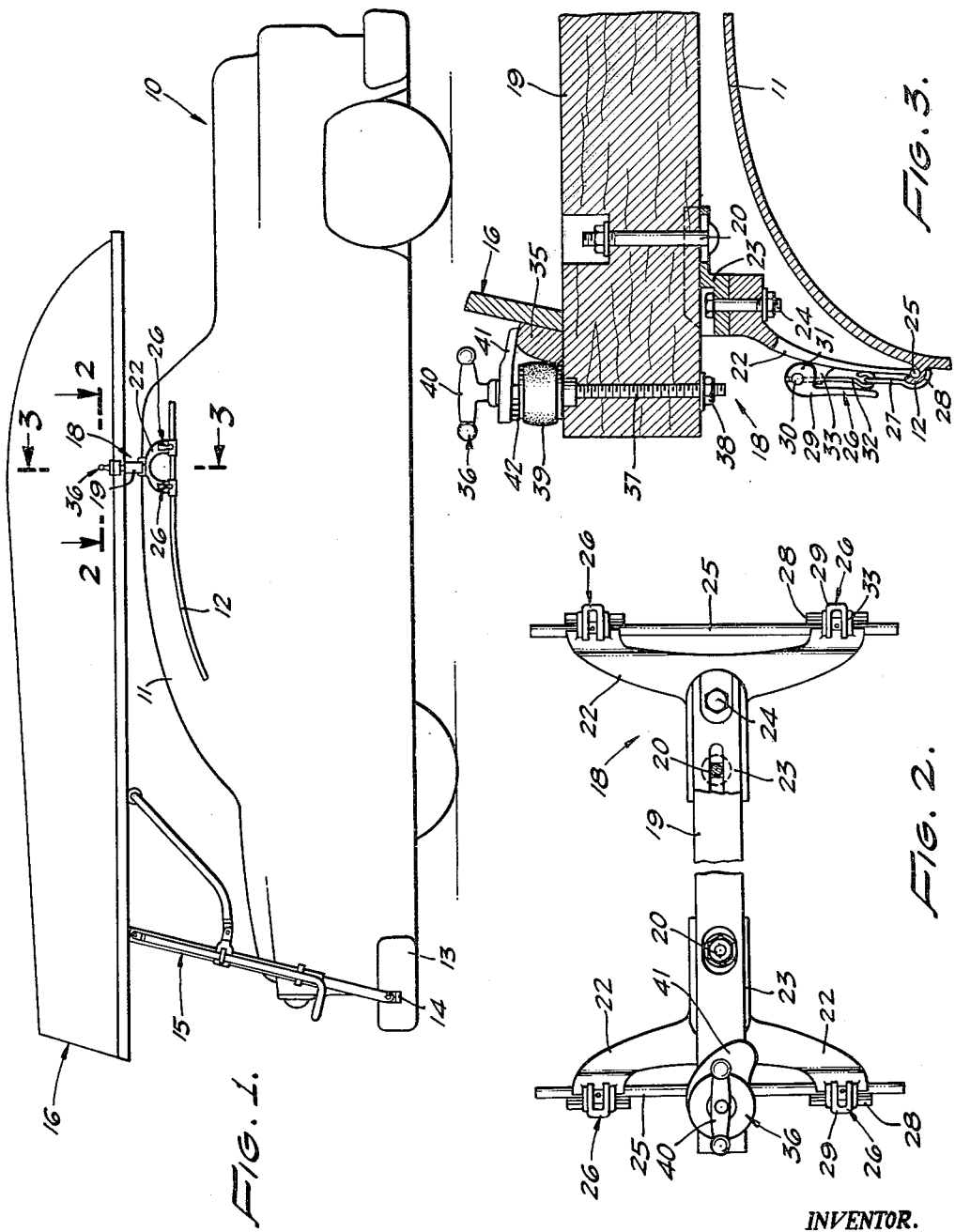
INVENTOR.
LAVERNE O. ELLINGSON
BY
ATTORNEY

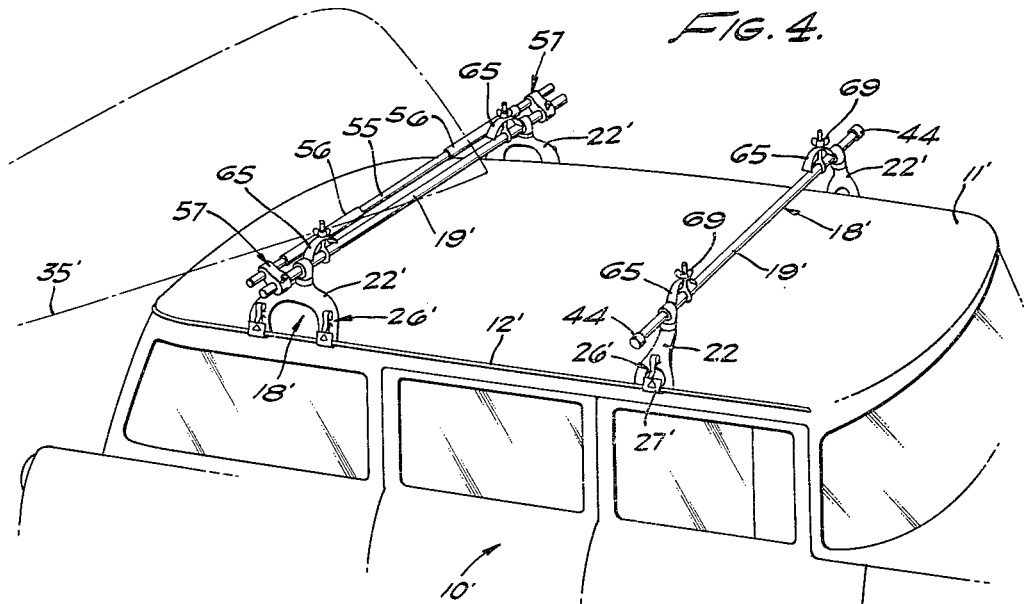
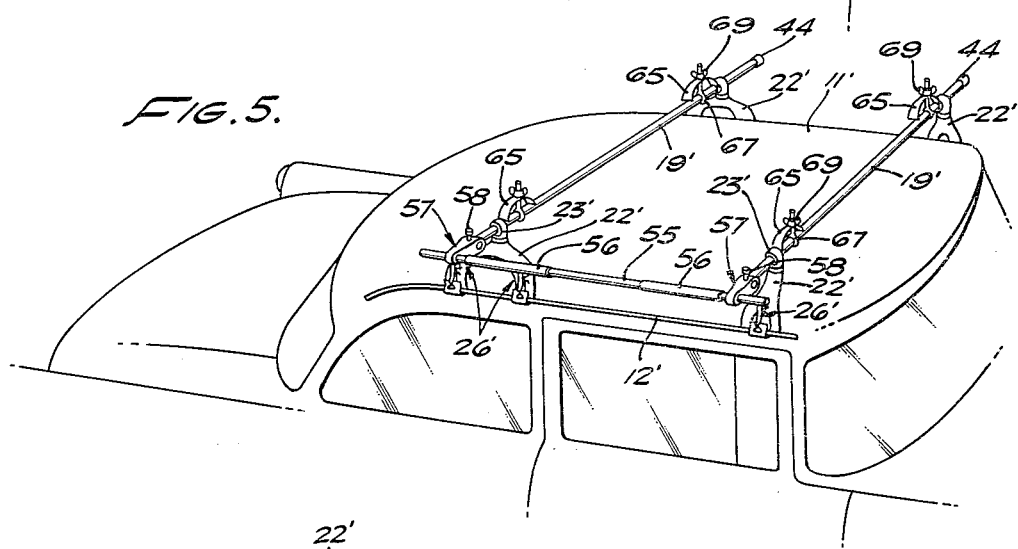
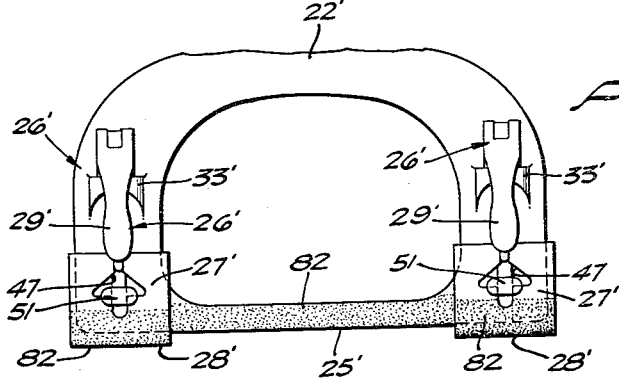

Nov. 20, 1962  LA VERNE O. ELLINGSON  3,064,841
BOAT CARRYING AND LOADING FACILITY FOR MOTOR VEHICLES
Filed May 12, 1958  3 Sheets-Sheet 3
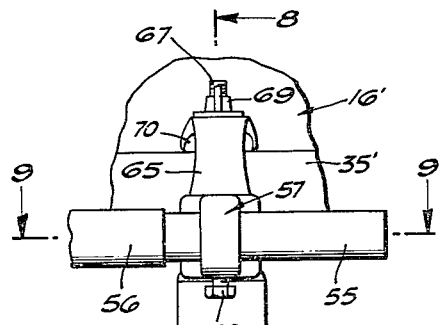
FIG. 7.
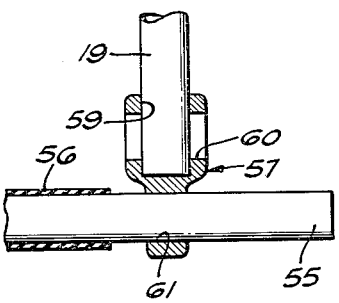
FIG. 9.
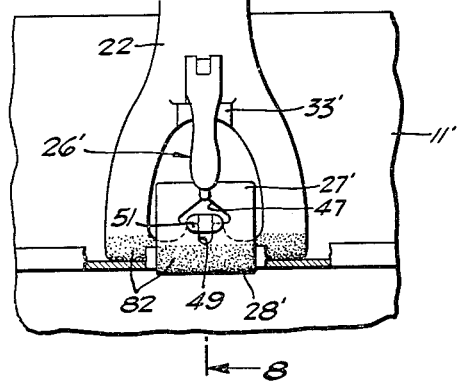
FIG. 8.
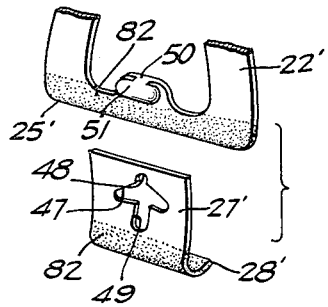
FIG. 10.
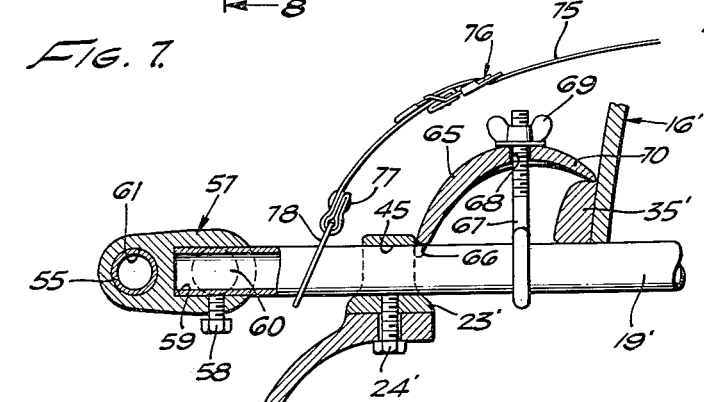
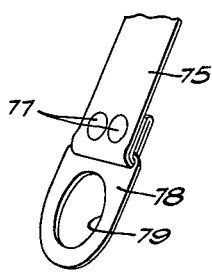
FIG. 11.
INVENTOR.
LAVERNE O. ELLINGSON
BY
ATTORNEY United States Patent Office 3,064,841
Patented Nov. 20, 1962

3,064,841
BOAT CARRYING AND LOADING FACILITY
FOR MOTOR VEHICLES
La Verne O. Ellingson, Monrovia, Calif., assignor to Quick-N-Easy Products, Ltd., Monrovia, Calif., a corporation of California
Filed May 12, 1958, Ser. No. 734,750
6 Claims. (Cl. 214—450)

The present invention relates to cargo carrying devices adapted for attachment to the tops of motor vehicles and more particularly to an improved facility of this type featuring a positive interlocking clamp means for holding the same detachably clamped to the rain gutter of a vehicle top as well as improved means for aiding the loading and unloading of a small boat with respect to a motor vehicle.

The present application is a continuation-in-part of my pending application for United States Patent, Serial No. 667,314, filed June 20, 1957 and entitled Automobile Boat Loading and Carrying Attachments, now Patent 2,887,237 granted May 19, 1959. A great many proposals have been made for devices which can be attached to fittings of various motor vehicles, and particularly the passenger type, to the end that cargo of many different types can be transported while lashed to the top of the vehicle. Although devices of this type are in use, all known to applicant are subject to certain disadvantages and shortcomings obviated by the present invention. Certain of these devices are adapted to be anchored to the door hinges, or to the opposite ends of the car roof, or to the top rail of the car windows after the latter have been lowered to admit hooks or other anchoring devices. These are unsightly and interfere with the normal use of the car doors and windows. Other types attempt making an anchorage connection with the rain gutters along the opposite sides of the vehicle top but are inadequate to provide a positive interlock with these gutters with the result that not infrequently the anchorage becomes detached resulting in damage to the vehicle as well as loss or serious damage to the articles lashed to the roof.

The present construction has for its purpose the elimination of the disadvantages and shortcomings of prior devices and provides a very simple and inexpensive cargo carrier loading facility presenting many advantages over prior constructions. Among these is the provision of an unusually sturdy clamp having supporting feet shaped to seat snugly within the vehicle rain gutter and including a manually-actuated toggle clamp so constructed and designed that it is impossible to detach the clamp from the rain gutter while the toggle clamp is closed. Secured between pairs of these clamps on the opposite sides of the vehicle is a rigid supporting member cooperating with a similarly supported member at the opposite end of the vehicle top to provide a wide area base for cargo of all types. A feature of the invention is the provision of an elongated roller element adapted to be supported selectively parallel with either one of the rigid transverse members or cross-wise between the adjacent ends of these members. While supporting in any one of these manners, the rolling member facilitates the loading and unloading of small boats and the like. Thus, the resiliently covered roller provides a support for the gunwales of a boat as the latter is rolled across the roller into position for support on the aforementioned pair of transverse members. Whether the boat is loaded from the side of the vehicle or from one end it is maneuvered into a carrying position lengthwise of the vehicle.

The loading and carrying facility includes clamps adjustable along the rigid members and engageable with the gunwales of the boat for locking it firmly in carrying position. Supplementing these clamps in lashing the boat or other cargo to the carrier facility is a strap the opposite ends of which terminate in flat metal rings slidable along the rigid members when held normal thereto and operable to firmly grip the rigid members when the strap is tensioned.

Accordingly, it is a primary object of the present invention to provide an improved cargo loading and carrying facility adapted for use on the tops of motor vehicles.

Another object of the invention is the provision of an improved cargo carrying attachment for motor vehicles featuring an improved means for detachably clamping the attachment to the rain gutters of such vehicles.

Another object of the invention is the provision of a cargo attachment for motor vehicles featuring the use of a roller by means of which loading and unloading of the cargo can be facilitated, such roller being selectively attachable at the user's election crosswise of the vehicle or along one side.

Another object of the invention is the provision of an attachment for a motor vehicle top and featuring an improved clamp which can be positively interlocked with the rain gutters of motor vehicles.

Another object of the invention is the provision of a simple and rugged cargo attachment for motor vehicles made from light weight tubing and rigidly anchorable to the vehicle rain gutter by toggle clamp devices rigid with the opposite ends of the tubing.

Another feature of the invention is the provision of a cargo loader and carrier for vehicles using tubing for supporting the cargo and including strong inexpensive flexible strap means quickly adjustable and instantly anchorable to any portion of the tubing as may be found desirable to fit the particular cargo to be transported.

These and other more specific objects will appear upon reading the following specification and claims and upon considering in connection therewith the attached drawings to which they relate.

Referring now to the drawings in which preferred embodiments of the invention are illustrated:

FIGURE 1 is a side of a passenger vehicle having a small boat secured to its top by means incorporating features of the invention;

FIGURE 2 is a top plan view of the cargo supporting attachment taken along line 2—2 on FIGURE 1;

FIGURE 3 is a fragmentary transverse sectional view on an enlarged scale taken along line 3—3 on FIGURE 1;

FIGURE 4 is a perspective view showing a second embodiment featuring a roller aid as positioned for the loading of cargo over one end of the vehicle;

FIGURE 5 is a similar view to FIGURE 4 but showing the roller aid mounted along one side of the vehicle to facilitate the side loading of cargo;

FIGURE 6 is a side elevational view showing the bottom half of one form of the anchorage with the toggle clamp in closed position;

FIGURE 7 is a similar side elevational view of a modified form of the clamp employing a single toggle clamp;

FIGURE 8 is a fragmentary transverse sectional view taken along line 8—8 on FIGURE 7;

FIGURE 9 is a fragmentary transverse sectional view taken on line 9—9 of FIGURE 7 and showing one position of the roller supporting adapter;

FIGURE 10 is a fragmentary exploded view of the gutter clamp showing details of the construction; and FIGURE 11 is a fragmentary perspective view of one end of the cargo lashing strap.

Referring first to the embodiment illustrated in FIGURES 1, 2 and 3 there is shown a conventional motor vehicle 10 having a roof 11 provided with the usual rain gutters 12 extending along and welded or otherwise rigidly anchored to either side of the top. Detachably clamped to rear bumper 13 as by clips 14 is a combined boat loader and carrying device designated generally 15 of any suitable type but preferably that disclosed in the United States patent to Ellingson, No. 2,670,113, granted February 23, 1954, or in my co-pending application for United States Letters Patent, Serial No. 667,314, filed June 20, 1957, entitled Automobile Boat Loading and Carrying Attachments.

Since loader 15 forms no part of the present invention, it need not be further described here other than to state that it is designed to be clamped to the gunwales of a small boat near the rear thereof while the boat is aligned with the vehicle opposite its rear end. Thereafter, the bow end of the boat may be over-ended onto the top of the vehicle 10 with a minimum of effort by a single operator. Likewise, by the use of loader 15 the boat may be transferred back to the ground with little effort and without danger to the operator or to the boat.

The cargo carrier incorporating features of the present invention is designated generally 18 and its constructional details will be best understood by reference to FIGURES 2 and 3. The carrier includes a rigid transverse member 19 here shown as being of wood and having a length generally corresponding to the width of vehicle top 11. Rigidly clamped to the opposite ends of member 19 as by bolts 20 are a pair of arcuate shaped, high strength yokes 22, 22. These yokes include a washer plate 23 grooved along its upper surface to straddle and seat the bottom edge of member 19 and having its outer end portion securely clamped to the top of yoke 22 as by bolts 24. Integral with the lower ends of the yoke legs are elongated rod-like members 25 adapted to seat snugly within the vehicle rain gutter 12.

Cooperating with members 25 in holding the yoke and the transverse member 19 rigidly anchored to rain gutters 12 are pairs of manually operable toggle clamps designated generally 26. These clamps include an L-shaped clip having its lower curved end 28 shaped to engage under and interlock with the rounded contour of the under side of the rain gutter. The operating toggle for clip 27 comprises a handle 29 pivotable about a transverse pin 30 eccentrically mounted within cammed portion 31 of the lever. Threadedly engaged within a transverse bore centrally of pin 30 is an eyebolt 32 having its eye seated in an opening through the upper end of clip 27. Cam portion 31 of the toggle lever bears against a projection 33 integral with yoke 22 and having a large opening therethrough for the shank of eyebolt 32.

It will be understood from the foregoing description that operating lever 29 is rotatable between the closed position shown in FIGURE 3 tightly clamped in interlocking engagement with the underside of rain gutter 12 and an open position with handle 29 rotated approximately 180 degrees clockwise in the latter of which positions the clip is lowered free of the rain gutter thereby permitting the elongated lower rim edge 25 of yoke 22 to be lifted free of the gutter.

Referring to FIGURE 3 it will be seen that gunwales 35 of boat 16 may be rigidly anchored to the opposite ends of transverse member 19 as by a clamp designated generally 36. This clamp comprises a threaded anchor bolt 37 clamped to member 19, as by nut 38. Fixed to the upper end of bolt 37 is a large thick washer of sponge rubber 39. Bolt 37 has a threaded bore seating a thumb screw 40 for pressing a clip 41 down against the underside of gunwale 35. Clip 41 has an opening freely receiving screw 40 and its outer end may be provided with projections 42 to provide a pivot point for the clip in a well known manner.

Referring now to FIGURES 4, 5 and 6 there is shown a second preferred embodiment of the invention wherein the similar or identical components to those described above are identified by the same reference characters distinguished by a prime. In this embodiment there are a pair of transverse members each conveniently formed by a lightweight tubular member 19' preferably having its ends covered by rubber-tipped caps 44 both for appearance purposes and the protection of persons and adjacent objects. Rigidly clamped to the upper ends of yokes 22' by cap screws 24' are ring elements 23' having circular bores 45 snugly fitting about the exterior of cross tubes 19' (FIGURE 8). Bolts 24' have a length such as to clamp rings 23' to the yokes while preventing movement of cross tubes 19' relative to bores 45.

Toggle clamps 26' provided on the exterior side of yokes 22' and operable to releasably clamp clips 27' against the underside of rain gutter 12' are generally similar to the corresponding construction described in connection with FIGURES 1 to 3, but differ in the provision of an important lost motion interlock means provided between the lower edge 25' of the yoke and clips 27'. The details of this important lost motion feature will be best understood by reference to FIGURES 7, 8 and 10 wherein it will be noted that the longer leg of clip 27' has an irregular shaped cutout 47 seating the loop of eyebolt 32' in its small notch 48. A larger downwardly extending notch 49 from opening 47 receives stem 50 of a T-headed keeper 51, it being understood that stem 50 is slightly longer than the thickness of clip 27'. Preferably clip opening 47 is only large enough to receive head 51 of the keeper. The parts are so proportioned relative to one another that in the closed position of toggle clamp 26' keeper stem 50 is seated in notch 49 in the manner clearly illustrated in FIGURES 7 and 8 with the result that it is impossible for clip 27' to move laterally away from gutter 12' or the lower edge 25' of yoke 22'. Neither can the yoke assembly move bodily away from the gutter since toggle lever 29' holds the clamp closed against the bottom and lower side of gutter 12'. However, upon rotating lever 29' 180 degrees clockwise from its closed position to lower eyebolt 32' and clip 27' downwardly away from yoke rim 25', there is abundant room to permit detachment of the yoke from the gutter.

A further important feature of the invention resides in the provision of a loading and unloading aid in the form of a roller tube 55 generally similar to tubes 19' and having resilient sleeves of rubber or plastic 56 encircling the tube. These sleeves provide resilient rests on which the gunwales 35 of the boat, for example, may be rested while loading and unloading the boat relative to the vehicle top.

The means for rotatably supporting roller tube 55 selectively from one or both tubes 19' comprises a pair of adapter fittings 57 provided with set screws 58 for clamping the same to tubes 19'. The construction of adapter 57 in such manner that it can be supported either along the length of tube 19' or at 90 degrees to one end thereof is best shown in FIGURE 9. As there appears, adapter 57 has two identical bores 59 and 60 intersecting one another at right angles whereby the adapter can be supported from the end of tube 19' by inserting the tube through bore 59. It is also arranged to be supported laterally along the side of tube 19 if the fitting is assembled over the tube by way of bore 60. A third bore 61 parallel to bore 60 is slightly larger in diameter to seat roller tube 55 freely therein.

In FIGURE 4 adapters 57 are shown supported from the opposite ends of the rear transverse member 19' with roller 55 rotatably supported parallel to the axis of tube 19'. When so supported roller 55 may be used while loading and unloading cargo over the rear end of the vehicle top. An alternate mode of supporting adapters 57 is shown in FIGURE 5 wherein the adapters are clamped to the outer ends of both of tubes 19' to support roller 55 lengthwise along one side of the vehicle. When so supported the roller can be used while loading and unloading cargo from the vehicle side. When substantially elevated into position for carrying, the cargo is rotated 90 degrees to lie across both supports 19' and lengthwise of the vehicle. The described roller and supporting adapters are a great convenience since it is often more convenient to load or unload a boat from the side rather than from one end of the top. It will be noted that the resilient sleeves 56 terminate well inside adapters 57 with the result that roller 55 is free for axial movement relative to the supporting adapters although this movement is limited by the spacing of the ends of sleeve 56 from adaptor 57. Accordingly, the sleeves permit limited relative movement without permitting the roller to become disengaged from the supporting adapters.

There remains to be described alternate means for clamping cargo in place on transverse rigid members 19', both forms being shown in FIGURE 8. One comprises an arch shaped clip 65 having a notched end 66 shaped to seat against the exterior of tube 19'. A threaded eyebolt 67 encircles tube 19' and extends through an opening 68 in the mid-portion of clip 65. A thumb nut 69 serves to clamp the free end 70 of the clip against cargo such as against the underside of gunwale 35' of boat 16'. As will be appreciated from the drawing, the described clamp is freely slidable along tube 19' to accommodate boats of different widths. Furthermore, while the boat is being loaded and unloaded, the clamping clip can be loosened for rotation downwardly out of the way until the boat is in position and ready to be anchored in place.

A more versatile means for lashing cargo comprises a flexible strap 75 of webbing or other suitable material having buckle means 76 attached to one pair of ends and including friction jaws of conventional construction for releasably holding the ends of the strap together in any adjusted position. Securely anchored to the opposite ends of strap 75 as by rivets 77 is a hardened, metal anchor ring 78 having an opening 79 slightly larger than the diameter of tubing 19'. Opening 79 has sharply cut edges and is of such size as to slide freely along tubing 19 so long as held substantially normal thereto. However, the tensioning of strap 75 acts to cant ring 78 in such manner that the sharp edges of opening 79 bite into tubing 19 thereby firmly anchoring it against sliding movement along the tubing. It will be apparent that rings 78 can be mounted outside or inside the connections of yokes 22' with tubing 19' depending upon the size of the load to be secured to the tubing members. These straps can also be used to supplement the clamping action of clips 65 and the eyebolt 67 if so desired. It will also be recognized that either the strap or the clamps 65 may be used to the exclusion of the other, or in the combination as desired. When no cargo is being carried both clips 65 and strap 75 may be tensioned against tube members 19' to prevent loose play and free movement of these members relative to other parts of the carrier structure.

It will be quite apparent from the foregoing that the described cargo carrying facility may be clamped in place in vehicle gutters in a matter of minutes, it merely being necessary to adjust the yoke members in the proper position along the rigid tube members 19 or 19' in order that the lower edge of the yokes may seat firmly in the rain gutters following which the toggle linkages are closed. On the occasion of their first use on a particular vehicle it may be necessary to adjust the eyebolts 32' to assure the proper clamping action for that particular vehicle gutter. This is accomplished by disconnecting the T-shaped keeper 51 through opening 47 of clip 27' to permit turning of the eyebolt in crosspin 30. After the proper adjustment is made the clip is reassembled with respect to keeper 51.

A feature of all embodiments is the provision of a resilient rubber or plastic coating 82 firmly bonded to the lower rim edge of yokes 22, 22' as well as to the lower end of clips 27, 27'. This coating which need not be thicker than a heavy layer of paint does not interfere with a strong rigid clamping action against the surfaces of the gutter yet avoids all possibility of damage to the vehicle finish.

While the particular cargo carrying facility for attachment to motor vehicles herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A clamp device for use in detachably clamping cargo or the like to the rain gutters of a vehicle top, said clamp device comprising an arcuate plate-like rigid member having a long, narrow lower rim edge adapted to seat within the open top of a vehicle rain gutter, a generally L-shaped rigid clamping jaw having a longer leg extending vertically beside the outer surface of said rigid member with its shorter leg projecting horizontally of said lower rim edge and adapted to embrace the lower and outer side walls of the gutter, manually operable toggle linkage means mounted on the outer side of said rigid member and connected to the upper end of said L-shaped jaw, said linkage being operable to clamp said device rigidly to said gutter or to release it therefrom, and means for positively restricting said L-shaped jaw to generally vertical movement toward and away from the lower rim edge of said rigid member whereby when said clamp device is closed against a gutter the device is positively interlocked therewith and cannot be removed except through breakage of its components.

2. A clamp device as defined in claim 1 wherein said arcuate plate-like rigid member has a long lower rim adapted to seat in a vehicle rain gutter, and further characterized by the provision of duplicate toggle linkages and attached clamping jaws spaced near the opposite ends of said lower rim edge.

3. A cargo carrier adapted for attachment to the gutter trough of a motor vehicle top, said cargo carrier comprising cargo supporting means including a plurality of supporting clamps adapted to be detachably anchored to a vehicle rain gutter, said supporting clamps having foot portions adapted to extend into and rest against the interior bottom of the gutter, adjustable clamp means secured to the side of said foot portions and including a clip engageable against the exterior underside of the gutter, lost-motion connection means between said clip and said foot portions for holding said clip against lateral displacement outwardly away from said gutter without limiting vertical movement thereof between clamping and unclamping positions, said adjustable clamp means including an over-center camming lever for adjusting said clip between its open and closed positions relative to the exterior underside of the gutter, and retainer means carried by said cargo carrier and engageable with said clip in a manner permitting said clip to move substantially vertically into and out of clamping engagement with said gutter while restraining the jaw from moving laterally away from said gutter, said clamping clip and said retainer means therefor being formed to engage and permit said clamping clip to move laterally away from the gutter after said clamping jaw has been opened to a predetermined position.

4. A small boat loading and carrying facility adapted to be anchored to the rain gutters along either side of a motor vehicle top and featuring an elongated roller selectively mountable on said facility along the side or across either end of the roof at the user's option depending on whether the boat is to be transferred between the ground and carrying position on the top by endwise movement of the boat from the side or from the end of the vehicle, said loading and carrying facility comprising a pair of rigid members extending parallel to one another across the opposite ends of a vehicle top and including clamp-equipped means for anchoring their ends rigidly to the vehicle rain gutters, said rigid members having unobstructed tubular ends projecting beyond the associated anchoring means for securing said rigid members to the vehicle rain gutters, a single elongated roller member having a length substantially as long as said rigid members, a pair of mounting brackets having means for supporting the same selectively from the opposite ends of either one of said rigid members and parallel thereto as well as in an alternate position parallel to the side of the vehicle top with said pair of brackets each mounted over the end of a different one of said pair of rigid members, said brackets having aligned openings therethrough adapted to receive and support the adjacent end of said single roller member in each of said selectively useable mounting positions of said mounting brackets.

5. A boat loading facility as defined in claim 4 characterized in that said roller mounting brackets are identical and comprise an elongated one-piece member having a pair of parallel openings extending across the opposite ends thereof, a third opening extending longitudinally of each bracket through one end thereof, one of said parallel openings being adapted to receive the end of said roller member therein, and each of the other of said openings being adapted to fit over the end of said rigid members so as to project either laterally or axially thereof at the user's option.

6. A boat loading facility as defined in claim 5 characterized in that said roller mounting brackets include a threaded fastener effective to clamp the bracket to the end of one of said rigid members irrespective of whether said bracket projects laterally or axially from said rigid member.

References Cited in the file of this patent

UNITED STATES PATENTS

| | | |
|---|---|---|
| 420,701 | Shaller | Feb. 4, 1890 |
| 2,434,387 | Brandt | Jan. 13, 1948 |
| 2,446,092 | Lait | July 27, 1948 |
| 2,469,945 | Brei | May 10, 1949 |
| 2,561,199 | Harder | July 17, 1951 |
| 2,584,163 | Squires | Feb. 5, 1952 |
| 2,613,020 | Berry | Oct. 7, 1952 |
| 2,782,972 | Binding | Feb. 26, 1957 |
| 2,784,888 | Le Canu-Deschamps | Mar. 12, 1957 |
| 2,797,007 | McNeely | June 25, 1957 |
| 2,859,887 | Haight | Nov. 11, 1958 |
| 2,887,203 | Baron | May 19, 1959 |
| 2,887,237 | Ellingson | May 19, 1959 |

FOREIGN PATENTS

| | | |
|---|---|---|
| 690,148 | Great Britain | Apr. 15, 1953 |
| 59,667 | France | Feb. 3, 1954 |
| 318,683 | Switzerland | Feb. 28, 1957 |

UNITED STATES PATENT OFFICE
CERTIFICATE OF CORRECTION

Patent No. 3,064,841                  November 20, 1962

La Verne O. Ellingson

It is hereby certified that error appears in the above numbered patent requiring correction and that the said Letters Patent should read as corrected below.

In the grant, lines 2 and 12, and in the heading to the printed specification, line 5, name of assignee, for "Quick-N-Easy Products, Ltd.", each occurrence, read -- Quik-N-Easy Products, Ltd. --.

Signed and sealed this 6th day of August 1963.

(SEAL)
Attest:

ERNEST W. SWIDER
Attesting Officer

DAVID L. LADD
Commissioner of Patents